March 17, 1970  R. J. MELANSON  3,501,667
SURGE PROTECTOR FOR SECONDARY VOLTAGE CIRCUITS
Filed Nov. 25, 1968  2 Sheets-Sheet 1
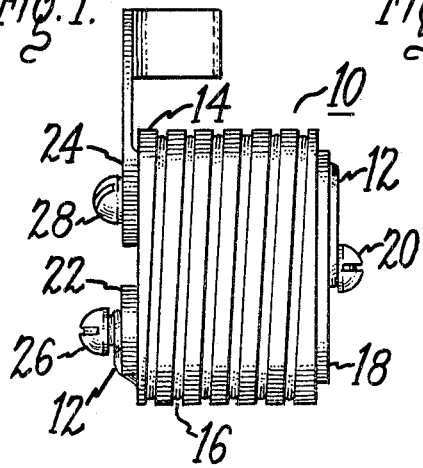
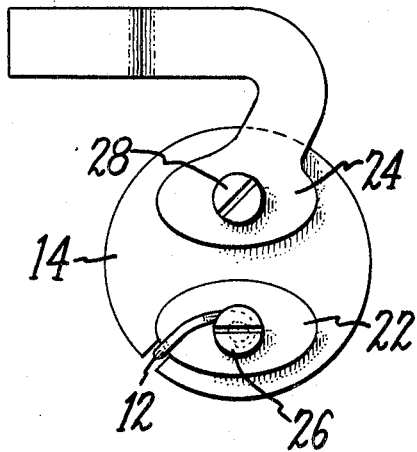
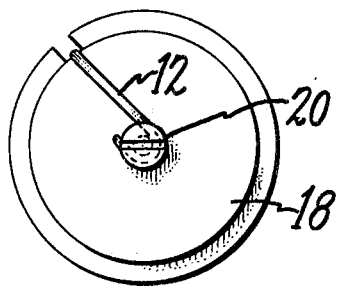
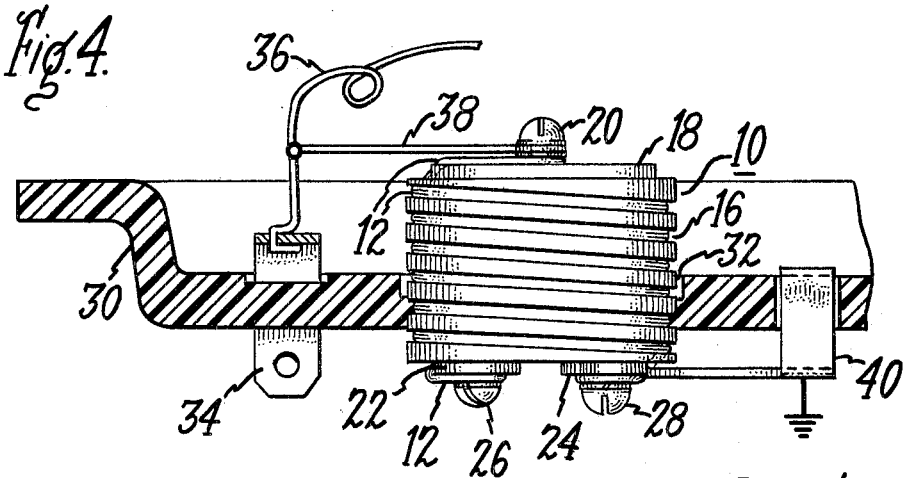
Inventor,
Roland J. Melanson,
by Francis X. Doyle
His Attorney.

March 17, 1970 R. J. MELANSON 3,501,667
SURGE PROTECTOR FOR SECONDARY VOLTAGE CIRCUITS
Filed Nov. 25, 1968 2 Sheets-Sheet 2

Inventor,
Roland J. Melanson,
by Francis X. Doyle
His Attorney.

United States Patent Office 3,501,667
Patented Mar. 17, 1970

3,501,667
SURGE PROTECTOR FOR SECONDARY VOLTAGE CIRCUITS
Roland J. Melanson, Rochester, N.H., assignor to General Electric Company, a corporation of New York
Filed Nov. 25, 1968, Ser. No. 778,688
Int. Cl. H01j 17/00, 21/00
U.S. Cl. 313—325                                10 Claims

ABSTRACT OF THE DISCLOSURE

A surge protector for secondary voltage A.C. circuits including an electrical resistance in series with an air gap. A length of resistance wire has one end connected to a terminal of the surge protector, the terminal being mounted on one end of a winding form. This terminal is connected to a secondary voltage line to be protected from voltage surges. The resistance wire is wound as a coil on the winding form. At the other end of the coil form, an air gap is provided between a pair of metallic electrodes. The other end of the resistance wire is connected to one electrode while the other electrode is normally connected to ground. In a second form of the invention a deionization chamber is placed around the air gap.

BACKGROUND OF THE INVENTION

This invention related to surge protectors and more particularly to surge protectors for use with electrical apparatus in secondary or low voltage A.C. circuits.

Many types of electrical apparatus must be protected from voltage surges which may occur during switching, lightning or other electrical disturbances. The primary or high voltage portion of electrical distribution systems are usually protected by lightning arresters. However, the low voltage or secondary portions of the distribution system are usually not so protected. The various types of electrical apparatus which are connected to the secondary voltage circuit require protection to prevent damage to such apparatus due to possible voltage surges which may occur from any of a variety of electrical disturbances. One well-known type of apparatus found on low voltage lines are watthour meters.

At the present time, these electrical devices, such as watthour meters, connected in the low voltage line of a distribution system use simple air gaps to produce a momentary short circuit across the lines or between a line and ground. One type of air gap is shown in Patent No. 2,922,953. These short circuits produce a high current through the gap which tends to burn or erode the electrodes and with very high short circuit current, the arc may discolor or damage the apparatus which surrounds the air gap. With today's power systems, very high short circuit currents are available in the low voltage circuits. These short circuit currents may be in the order of 5000 amps or more. Thus, with today's power systems, the simple air gap construction rapidly deteriorates during arcing and very shortly leaves the electrical device without adequate protection during later voltage surges. From the above, it will be apparent that there is presently a need for surge protectors for electrical apparatus connected to low voltage circuits which will limit the short circuit current and also protect the electrodes from rapid deterioration such that the device will not become unprotected after a few voltage surges.

Of course, conventional low voltage arresters are known. However, these devices are not appropriate for use on many types of electrical apparatus due to the large size and cost of such secondary arresters relative to the electrical apparatus. For example, many secondary or low voltage arresters are nearly as expensive as a watthour meter and must be mounted separate from the meter. It is desirable that a surge protector be small enough to be built into the electrical apparatus, such as a watthour meter, and which will not substantially increase the cost of such apparatus.

It is therefore one object of this invention to provide a surge protector for secondary voltage A.C. circuits which will limit the short circuit current during its operation.

A further object of this invention is to provide a surge protector for secondary voltage A.C. circuits having an air gap wherein the electrodes will not be damaged in the area of the gap during arcing.

A still further object of this invention is to provide a surge protector for low voltage A.C. circuits which may be easily installed and replaced on such low voltage circuits.

Yet another object of this invention is to provide a surge protector for low voltage A.C. circuits which is small and self-contained so as to be readily added to relatively small size apparatus which is connected in secondary voltage circuit.

SUMMARY OF THE INVENTION

Briefly, in one form the surge protector of this invention comprises an electrical resistance connected in series with an air gap. The electrical resistance is in the form of a coil having one end connected to a terminal of the surge protector while the other end is connected to one of the electrodes which forms the air gap for the surge protector.

The invention which is sought to be protected will be particularly pointed out and distinctly claimed in the claims appended thereto. However, it is believed that this invention and the manner in which its various objects and advantages are obtained as well as other objects and advantages thereof may be more clearly understood by reference to the following detailed description of a preferred embodiment thereof particularly when considered in the light of the accompanying drawings.

BRIEF DESCRIPTION OF DRAWINGS

FIG. 1 is a side view of one form of surge protector according to this invention;

FIG. 2 is an end view of one end of the form of surge protector shown in FIG. 1, showing one form of air gap which may be used in this invention;

FIG. 3 is an end view of the other end of the surge protector shown in FIG. 1;

FIG. 4 is a partial sectional view showing the surge protector of this invention applied to an electrical device;

DESCRIPTION OF PREFERRED EMBODIMENT

Figure 5:
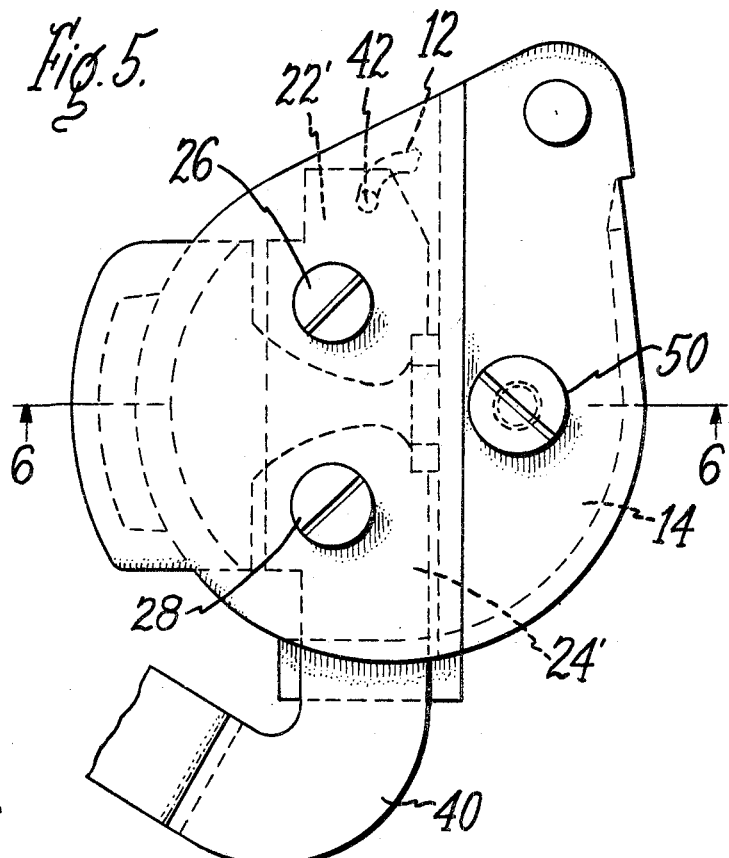
FIG. 5 is an end view of a second embodiment of a surge protector made according to this invention.

The surge protector of this invention consists of an electrical resistance connected in series with an air gap, with the surge protector being connected across a pair of low voltage lines to be protected or between one such line and ground. In the preferred embodiment shown particularly in FIG. 1, the surge protector 10 comprises a length of resistance wire 12 which is wound in the form of a coil on a piece of heat resistant insulating material 14. An example of such heat resistant insulating material is nylon and other types of polycarbonate material. The insulating material 14 is preferably a cylindrical member, as shown, provided with a spiral groove 16 extending from one end to the other, as is shown. Resistance wire 12 is wound in the spiral groove 16, which holds the wire 12 in place in a small compact space and provides insulation between the various turns of the wire 12. With groove 16 being of a greater depth than the diameter of the wire 12, the cylindrical form serves to space wire 12 from any surface which might suround the surge protector 10. This is especially important if such surrounding material is not heat resistant since during operation of the surge protector 10 the wire 12 reaches high temperatures as will be understood.

One end of the winding form 14 is provided with a metallic terminal or end 18 which is provided with one or more screws 20. As is shown in FIGS. 1 and 3 one end of resistance wire 12 is wrapped about screw 20 and held in firm contact with terminal 18. The opposite end of the winding form is provided with a pair of electrodes 22, 24, each electrode being provided with a screw member 26, 28 respectively, as particularly shown in FIG. 2 of the drawing. As is shown in FIGS. 1 and 2, the opposite end of resistance wire 12 is connected to one electrode, electrode 22, by wrapping about screw 26 as is clearly shown in FIG. 2. As will be understood the electrode 22, 24 are spaced apart so as to provide a desired air gap therebetween. As is well known, the dimension of the air gap will determine the voltage at which the device will operate, which thus determines the level of protection which may be provided to the secondary voltage circuits by the surge protector device 10. One of the lines of the circuit to be protected will be connected to the terminal or end 18. For example, a line may be readily connected thereto by wrapping a lead about screw 20 and connecting such lead to the line to be protected. A second surge protector would be provided for another line of the circuit to be protected. As will be understood, the other electrode of the air gap, electrode 24 will be connected to ground.

As will be understood, the electrodes 22 and 24 may be of any desired shape to form the air gap. In the particular preferred embodiment shown, the air gap is formed by electrodes 22 and 24, wherein the adjacent ends of electrodes 22 and 24 are curved such that the central portion provides the smallest air gap between the electrodes. The edges of the electrodes diverge at opposite ends such that the air gap becomes longer as it extends from the central portion as is clearly apparent in FIG. 2. As will be understood, when a voltage surge appears across the circuit to be protected, and such surge reaches the breakdown voltage of the air gap between electrodes 22 and 24, an arc will form across the gap effectively short circuiting such gap. This, of course, places the impedance of resistance wire 12 across the circuit to be protected. As will be understood, the impedance of the resistance wire 12 will limit the short circuit current thereby providing a relatively low value of current due to the resistance wire 12 in series with the air gap between electrodes 22 and 24. A distinct advantage of the preferred form of the invention is the arc controlling property of the system which is achieved by the positioning of the gap relative to the resistance wire 12 which is mounted in the form of a coil. Whenever the air gap breaks down there is a current flow in the coil formed by resistance wire 12 which will produce a strong magnetic field in the air gap formed between electrodes 22 and 24. This magnetic field is in correct relationship to force the arc which forms in the air gap between electrodes 22 and 24 out to the diverging ends of the gap formed at the distant ends of the electrodes. This action serves to prevent the burning and destruction of the electrodes at the smaller portion of the air gap and also prevents the formation of a hot spot at the smaller portion of the air gap which would otherwish provide a favorable condition for restrike of the arc after it has been extinguished due to the line voltage passing through a zero voltage value.

FIG. 4 shows the application of the surge protector 10 to an electrical apparatus connected to the secondary line of a power distribution system. The electrical apparatus indicated in FIG. 4 may be, for example, an electrical watt-hour meter. As shown in FIG. 4 an insulated base member 30 is provided with an opening 32 in which is mounted the surge protector 10 in any desired manner. The electrical device indicated by base plate 30 is usually provided with a plurality of terminals such as, for example, the terminal indicated at 34 in the form of a spade member which, as is understood by those skilled in the art, may be connected to the jaw of a meter socket (not shown). Connected to terminal 34 may be, for example, the potential coil of the watthour meter indicated by the wire 36. As will be understood, the potential coil 36 may be subjected to voltage surges which would be carried from the secondary voltage source (not shown) through terminal 34 to potential coil 36. To protect potential coil 36 from such voltage surges, the protector 10 has one terminal, such as terminal 18, connected to terminal 34 by means of a wire 38 which is connected at one end to screw 20 in terminal 18. As previously discussed, the electrode 22 forming the air gap has one end of wire 12 connected thereto. The wire is wound in the groove 16 in the coil winding form 14 and the opposite end connected to the terminal 18 by means of screw 20. The other electrode 24, of the air gap will be connected to the ground. Grounding may be provided by ground strap 40, connected to terminal or electrode 24 by screw 28. As will be understood, the ground strap 40 will usually be grounded against the meter socket (not shown) in which the meter is mounted. Of course, for other types of electrical apparatus, any desired means of grounding electrode 24 may be provided.

As will be understood, should a voltage surge occur on terminal 34 of such magnitude as to break down the voltage gap between terminals 22 and 24, the voltage gap would arc over and effectively short circuit the voltage gap and place the impedance of wire 12 in series between the terminal 34 and ground. This would prevent the surge voltage from being applied to the potential coil 36. Of course, as has earlier been discussed, the impedance of wire 12 in series with the air gap between electrodes 22 and 24 would limit the short circuit current across such gap and the placement of wire 12 in coil form will force the arc to the diverging ends of the gap thereby preventing damage to the gap of the electrodes while harmlessly grounding the voltage surge through the ground strap 40. Of course, it will be obvious to those skilled in the art that the application of the surge protector of this invention as shown in FIG. 4 is one of the many applications which may be made to the electrical apparatus connected to secondary lines of electrical power systems. It will, of course, be understood that if desired the surge protector 10 may be connected between the terminals going to the potential coil 36 rather than grounded as shown. Alternatively, a pair of surge protectors 10 could be provided one for each of the terminals with each of the surge protectors being grounded in the manner shown in FIG. 4.

OTHER EMBODIMENTS

Figure 6:
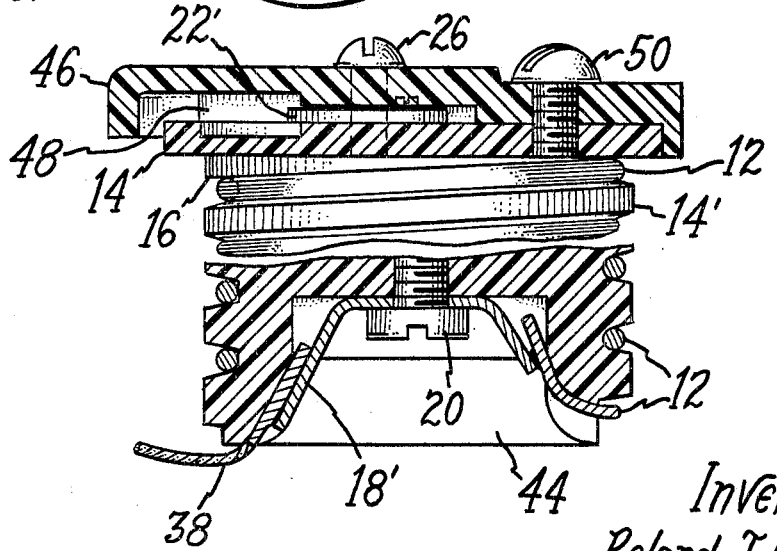
FIG. 6 is a sectional view of the embodiment shown in FIG. 5, taken on the line 6—6 of FIG. 5.

Referring now to FIGS. 5 and 6, alternative terminal and electrode structures are shown, as well as a further embodiment of the surge protector of this invention. In FIG. 5, electrodes 22' and 24' are shown with a small arc gap at one end of the electrodes. In this structure the electrodes 22' and 24' diverge toward the other ends to provide an elongated air gap. Electrode 22' is provided with opening or hole 42 in which one end of wire 12 is inserted. There is no need to weld or solder wire 12 to electrode 22', since on the first impulse they will weld together.

Insulating member 14', best shown in FIG. 6 is provided with a helical or spiral groove 16 for receiving wire 12, as in FIG. 1. However, as shown, terminal 18' is substantially U-shaped, and is mounted in a bore or hollow end 44 formed in the end of insulating member 14'. One end of wire 12 is wedged between one end of terminal 18' and member 14' as shown to obtain pressure contact. In a similar manner lead 38 is wedged between the other end of terminal 18' and member 14'. These connections will weld together on the first impulse through the surge protector 10'.

If desired, contact may be made to terminal 18' in other ways. For example, a spring member may be provided on the electrical apparatus for making electrical contact to screw 20. This type of contact would simplify the installation and removal of the protector should replacement be necessary.

In the embodiment shown in FIGS. 5 and 6 a cap member 46 is provided over electrodes 22' and 24'. Cap 46 forms a deionization chamber 48 for the arc gap formed between electrodes 22' and 24'. In many types of electrical apparatus when the surge protector is confined within the apparatus, the ionized gases formed in the air gap by the arc may cause electrical failure in the apparatus. By means of the deionizing chamber 48, formed by cap 46, the ionized gases formed in the air gap will not be expelled into the electrical apparatus. The cap member 46 is preferably a unitary member and is secured to member 14' by means of screw 50. Screws 26 and 28 are provided to secure electrodes 22' and 24' to insulating member 14'. Screw 28 also secures ground strap 40 electrically to the electrode 24'. As will be understood, ground strap 40 may be an integral part of electrode 24'.

In another embodiment, the cap member 46 may fit tightly over member 14. In such construction, member 46 would be a flexible, insulating material to act as a flap valve. As will be understood, cap 46 would flap open to release the pressure built up in the deionization chamber during arcing.

In the above described embodiments the resistance wire 12 is provided in the form of a coil piece placed within the spiral groove 16 of the insulating member 14. This is preferred, particularly with the diverging gaps shown, to prevent the arc from sticking in the gap. However, it should be understood that any suitable resistance in series with the gap may be provided which is not in coil form. This would provide the desired impedance in series with the gap to thereby limit the short circuit current of the arc. Of course, where divergent electrodes are provided, some form of coil would be necessary to control the position of the arc.

While there has been shown and described the present preferred embodiments of this invention, it will, of course, be obvious to those skilled in the art that various changes may be made in the construction set forth without departing from the spirit and scope of the invention, particularly as it is defined in the appended claims.

What is claimed as new and which it is desired to be secured by Letters Patent of the United States is:

1. A surge protector for secondary or low voltage A.C. circuits comprising in combination a resistance wire; a heat resistant insulating member; a metallic terminal member secured to one end of said heat resistant member forming a first terminal of the surge protector; a pair of electrodes forming an air gap mounted on the other end of said heat resistant member; said resistance wire mounted on said heat resistant member and having one end secured to said metallic terminal and the other end secured to one of said pair of electrodes, the other electrode of said pair of electrodes forming the second terminal of the protector.

2. A surge protector as claimed in claim 1 in which a cap member is provided on said heat resistant insulating member surrounding said pair of electrodes to form a deionization chamber.

3. A surge protector for secondary or low voltage circuits as claimed in claim 1 in which said resistance wire is wound in coil form on said heat resistant member and in which each of said pair of electrodes has adjoining curved edges, diverging to form an expanding air gap.

4. A surge protector for secondary or low voltage circuits as claimed in claim 3 in which a cap member is provided on said heat resistant member surrounding said electrodes to form a deionization chamber for said air gap.

5. A surge protector for secondary or low voltage circuits as claimed in claim 1 in which said heat resistant member is provided with a spiral groove extending from one end to the other and said resistance wire is wound in coil form on said heat resistant member in said spiral groove.

6. A surge protector for secondary or low voltage circuits as claimed in claim 5 in which each of said pair of electrodes has adjoining curved edges, diverging to form an expanding air gap, said air gap being mounted in the magnetic field created by said wire wound in coil form.

7. A surge protector as claimed in claim 5 in which a cap member is provided on said heat resistant member surrounding said pair of electrodes to form a deionization chamber for said air gap.

8. A surge protector for secondary or low voltage A.C. circuits comprising, in combination;
   a length of resistance wire,
   a metallic terminal forming a first terminal of the surge protector,
   a pair of electrodes forming an air gap,
   means for mounting said resistance wire with one end thereof electrically connected to said metallic terminal, and the other end of said resistance wire electrically connected to one electrode of said pair of electrodes, the other electrode of said pair of electrodes forming a second terminal of the surge protector.

9. A surge protector as claimed in claim 8 in which said means is a heat resistant member with said metallic terminal mounted on one end thereof and said pair of electrodes mounted on the other end thereof.

10. A surge protector as claimed in claim 9 in which a cap member is provided on the other end of said heat resistant member, said cap member enclosing said pair of electrodes and forming a deionization chamber for said air gap.

References Cited

UNITED STATES PATENTS 2,917,662  12/1959  Cunningham _____ 313—325 X
3,346,762  10/1967  Martin _____ 313—325 X JOHN W. HUCKERT, Primary Examiner R. F. POLISSACK, Assistant Examiner U.S. Cl. X.R.

315—35, 36